United States Patent
Woeste et al.

(10) Patent No.: US 11,383,617 B2
(45) Date of Patent: Jul. 12, 2022

(54) BATTERY MODULE

(71) Applicant: Aptiv Technologies Limited, St. Michael (BB)

(72) Inventors: Guido Woeste, Schwelm (DE); Peter Baeumer, Bochum (DE)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 16/686,281

(22) Filed: Nov. 18, 2019

(65) Prior Publication Data
US 2020/0164767 A1    May 28, 2020

(30) Foreign Application Priority Data

Nov. 26, 2018    (EP) .................................... 18208347

(51) Int. Cl.
*B60L 58/22*    (2019.01)
*B60L 58/21*    (2019.01)
(Continued)

(52) U.S. Cl.
CPC ............... *B60L 58/22* (2019.02); *B60L 58/21* (2019.02); *H01M 10/4257* (2013.01);
(Continued)

(58) Field of Classification Search
CPC .... B60L 58/22; B60L 58/21; H01M 10/4257; H01M 10/482; H01M 2010/4271;
(Continued)

(56) References Cited

U.S. PATENT DOCUMENTS

| | | | |
|---|---|---|---|
| 8,015,452 B2 * | 9/2011 | Li | H02J 7/0048 713/340 |
| 8,773,071 B2 * | 7/2014 | Martinelli | H02J 7/0016 320/119 |

(Continued)

FOREIGN PATENT DOCUMENTS

| | | | | |
|---|---|---|---|---|
| CN | 104953194 A | * | 9/2015 | ............ Y02E 60/10 |
| CN | 105765873 A | * | 7/2016 | .......... H02J 7/00047 |

(Continued)

*Primary Examiner* — M Baye Diao
(74) *Attorney, Agent, or Firm* — Billion & Armitage (57) ABSTRACT

A battery module for high voltage battery packs, preferably for use in vehicles, comprising a plurality of battery cells each comprising an electronic battery cell monitoring module attached to each of the battery cells, with the battery cell monitoring modules being connected to one another by a balancing bus comprising at least two electrical lines for transmitting data and electrical current, with the electronic battery cell monitoring modules being electrically connected to a positive terminal and to a negative terminal of the battery cell, with the electronic battery cell monitoring modules having a first electrical switch and a second electrical switch, with the electrical switches being configured to electrically connect the battery cells to a respective one of the two electrical lines of the balancing bus, with the battery module comprising an energy storage module for storing electrical energy, with the energy storage module being electrically connected to the two electrical lines of the balancing bus to take up or output energy over them, and with the electronic battery cell monitoring modules and the energy storage module being connected to one another by the balancing bus forming a cell balancing system.

16 Claims, 5 Drawing Sheets

(51) Int. Cl.
*H01M 10/42* (2006.01)
*H01M 10/48* (2006.01)

(52) U.S. Cl.
CPC .. *H01M 10/482* (2013.01); *H01M 2010/4271* (2013.01); *H01M 2220/20* (2013.01)

(58) Field of Classification Search
CPC ...... H01M 2220/20; H01M 2010/4278; Y02E 60/10; Y02T 10/70; H02J 7/0047; H02J 7/0014
USPC .......................................................... 320/104
See application file for complete search history.

(56) References Cited

U.S. PATENT DOCUMENTS

| | | | | |
|---|---|---|---|---|
| 8,786,261 B2 * | 7/2014 | Andrea | ................ | H02J 7/0016 |
| | | | | 320/152 |
| 9,325,177 B2 * | 4/2016 | van Zwam | ............ | H02J 7/0018 |
| 9,656,563 B2 * | 5/2017 | Ishigaki | ................ | B60L 11/182 |
| 9,912,177 B2 * | 3/2018 | Von Novak | ......... | B60L 11/1866 |
| 10,084,331 B2 * | 9/2018 | Sherstyuk | .............. | H02J 7/0068 |
| 10,374,440 B2 * | 8/2019 | Altemose | ............. | H02J 7/0014 |
| 10,444,295 B2 * | 10/2019 | Wen | ...................... | H02J 7/0047 |
| 10,680,447 B2 * | 6/2020 | Yang | ..................... | H02J 7/0047 |
| 10,790,678 B2 * | 9/2020 | Zheng | ................... | H02J 7/0019 |
| 2007/0001651 A1 * | 1/2007 | Harvey | ................. | H02J 7/0016 |
| | | | | 320/166 |
| 2010/0121511 A1 * | 5/2010 | Onnerud | ................. | B60L 58/15 |
| | | | | 701/22 |
| 2011/0135970 A1 | 6/2011 | Han et al. | | |
| 2011/0276289 A1 * | 11/2011 | Park | ..................... | G01R 21/133 |
| | | | | 702/62 |
| 2011/0318616 A1 * | 12/2011 | Kim | .................... | H01M 10/482 |
| | | | | 429/62 |
| 2017/0244092 A1 * | 8/2017 | Carkner | ................ | H01M 2/206 |
| 2017/0288422 A1 * | 10/2017 | Yang | ................... | H01M 10/482 |
| 2017/0366018 A1 | 12/2017 | Von Novak et al. | | |
| 2018/0034111 A1 | 2/2018 | Hinterberger et al. | | |
| 2018/0191173 A1 * | 7/2018 | James | ................... | H02J 7/0021 |
| 2019/0081365 A1 * | 3/2019 | Yamamoto | ............... | H05K 1/18 |
| 2019/0187213 A1 * | 6/2019 | Wen | ..................... | H01M 10/425 |
| 2020/0044460 A1 * | 2/2020 | Mikhaylik | .......... | H01M 10/443 |
| 2020/0280203 A1 * | 9/2020 | Sherstyuk | ............. | H01M 10/42 |

FOREIGN PATENT DOCUMENTS

| | | | | |
|---|---|---|---|---|
| CN | 107359669 A | * 11/2017 | ............ | H02J 7/0014 |
| DE | 102010001422 A1 | 8/2011 | | |
| DE | 102014215730 A1 | 2/2016 | | |
| WO | WO-2013104394 A1 | * 7/2013 | ........ | H01M 10/4207 |

* cited by examiner

BATTERY MODULE

CROSS-REFERENCE TO RELATED APPLICATION

This application claims the benefit under 35 U.S.C. § 119(a) of Patent Application No. 18208347.7 filed in the European Patent Office on Nov. 26, 2018, the entire disclosure of which is hereby incorporated by reference.

TECHNICAL FIELD OF THE INVENTION

The invention relates to a battery module for high voltage battery packs for use in vehicles and to a method for balancing the charge state of the individual battery cells among one another to an identical predefined level.

BACKGROUND OF THE INVENTION

Currently lithium-based rechargeable battery cells are preferably used, inter alia, for electromobility, in particular in the automotive sector, as the basis for battery modules and such are used as the basis for high voltage battery packs. Rechargeable battery modules are known that are interconnected from a plurality of individual battery cells connected in series or battery cell blocks connected in parallel. Such battery modules are also connected in series and in parallel to form high voltage battery packs. There is the problem on a serial connection of rechargeable batteries that as the number of charge and discharge cycles increases, the rechargeable battery capacities or charge states of the cells drift apart and the total capacity of a pack is continuously reduced oriented on the weakest cell.

It is known in the prior art to balance the charge between the cell levels to avoid such a behavior. This is typically done passively on charging by an electronically controlled switching in of resistance values to the cells that have already reached a high level of charge to thus lead the current for charging the other cells past this "full cell". So-called active balancing is furthermore used to reduce the electrical losses arising in the passive method. In this respect, charge portions are electronically withdrawn from cells with higher charge and released again to cells of lower charge. This is typically implemented by a central common electronic unit.

Central electronic systems monitor and balance a fixed cell grouping. In this respect, energy portions are removed from individual cells, are buffered via voltage converters and are then released to another individual cell again. A complex wiring and electronic system is required here that merges the voltage taps and temperature sensor signals centrally on the electronics. After a dismantling into individual cells, where possible, all the data on the individual cells are no longer available. The cells then have to be laboriously individually characterized so that they can be reassembled in a manner identified as equivalents.

There remains a need in the art for a battery module having a battery cell management system that can balance a battery module cost efficiently and energy efficiently and records and stores the cell history of every single battery cell without any gaps.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

A battery module comprises a plurality of battery cells. An electronic battery cell monitoring module is attached to each of the battery cells. The battery cell monitoring modules are connected to one another by a balancing bus comprising at least two electrical lines for transmitting data and electrical current. The electronic battery cell monitoring modules are electrically connected to a positive terminal and to a negative terminal of a battery cell. The electronic battery cell monitoring modules have a first electrical switch and a second electrical switch. The electrical switches are configured to electrically connect the battery cells to a respective one of the two electrical lines of the balancing bus. The battery module comprises an energy storage module for storing electrical energy. The energy storage module is electrically connected to the two electrical lines of the balancing bus to take up or output electrical energy over them. The electronic battery cell monitoring modules and the energy storage module are connected to one another by the balancing bus and form a cell balancing system.

The electronic battery cell monitoring modules and the battery cells used are substantially of the same construction. The electronic components used in the battery cell monitoring modules should be identical or technically comparable in all battery cell monitoring modules. A smooth running of the control programs that control the battery cell monitoring modules is thereby ensured. In addition, they can be manufactured in large volumes in a technically highly integrated manner and inexpensively by the standardization. The control programs that are used for the control of the battery cell monitoring modules are likewise identical. The electronic battery cell monitoring modules that are each fixedly connected to a battery cell continuously detect the characteristic values of the battery cell. The characteristic values of the battery cell are at least the electrical voltage between the battery terminals and the temperature of the battery cell. The battery cell monitoring modules further detect the electrical voltage between the at least two electrical lines of the balancing bus and can thereby evaluate the charge state of the electrical energy storage module. The electronic battery cell monitoring modules have the ability to communicate with one another via the balancing bus, with a network in accordance with the known multi-master system being able to be used. The electronic battery cell monitoring modules communicate with one another and compare the voltage values of their own battery cells with the voltage values of the other battery cells. After a consensus of all the electronic battery cell monitoring modules has been formed, a monitoring module connects its battery cell that has the highest electrical voltage together with at least one adjacent battery cell to the two electrical lines of the balancing bus and conducts electrical energy over them from the battery cells into the electrical energy storage device and then disconnects from the two electrical lines of the balancing bus. A battery cell that has too low an electrical voltage then connects to the two electrical lines of the balancing bus and conducts electrical energy over them from the electrical energy storage device into the battery cell and disconnects from the two electrical lines of the balancing bus again. This procedure carries on continuously. The energy storage module can comprise a capacitor, an electric coil, or a combination of a capacitor and an electric coil or other components capable of storing electrical energy.

Beyond the module borders, the balancing bus can also be connected to further buses in other modules to raise the balancing system to the total battery level. Alternatively, a higher ranking balancing system can also balance charge between modules in accordance with the same principle instead of the individual cells discharging and taking up charges.

The method of adapting the charge of the individual battery cells of a battery module to a predefined level comprises the steps:

a) Providing a battery module for high voltage battery packs, preferably for use in vehicles, each comprising a plurality of battery cells comprising a respective electronic battery cell monitoring module attached to each of the battery cells, with the battery cell monitoring modules being connected to one another by a balancing bus comprising at least two electrical lines for transmitting data and electrical current, with the electronic battery cell monitoring modules being electrically connected to a positive terminal and to a negative terminal of the battery cell, with the electronic battery cell monitoring modules having a first electrical switch and a second electrical switch, with the electrical switches being configured to electrically connect the battery cells to a respective one of the two electrical lines of the balancing bus, with the battery module comprising an energy storage module for storing electrical energy, with the energy storage module being electrically connected to the two electrical lines of the balancing bus to take up or output energy over them, and with the electronic battery cell monitoring modules and the energy storage module connected to one another by the balancing bus forming a cell balancing system;

b) Connecting the positive terminal of the battery cell to the negative terminal of the adjacent battery cell and connecting the negative terminal of the battery cell to the positive terminal of the adjacent battery cell such that a serial connection of all the battery cells is produced, with a positive terminal and a negative terminal of the serial connection not being connected to one another and each forming the +/− terminal of the battery module;

c) Starting the communication of all the connected battery cell control modules over the balancing bus;

d) Identifying all the battery cell monitoring modules;

e) Determining the arrangement of the battery cells in the battery module;

f) Swapping all the charge states of the battery cells over the balancing bus;

g) Taking over of control (for example) by the battery cell monitoring module having the highest transmitted charge voltage;

h) Switching two battery cells connected in series to the balancing bus in each case by the positive terminal of the one cell and the negative terminal of the other cell, with one of the cells being the cell with the highest cell voltage and the second cell disposed in series having the comparatively higher cell voltage of these two adjacent cells disposed in series;

i) Charging the electrical energy storage device;

j) Disconnecting the battery cells from the balancing bus;

k) Switching the positive terminal and the negative terminal of the battery cell having the lowest charge voltage to the balancing bus;

l) Charging the battery cell with the energy of the electrical energy storage device;

m) Disconnecting the battery cells from the balancing bus; and n) Continuing with method step f).

The electronic battery cell monitoring modules are advantageously configured as multi-master systems so that the battery cells in the assembly can carry out the active balancing without external initialization.

Each battery cell monitoring module transmits its charge state cyclically. They are buffered in each battery cell monitoring module. The battery cell monitoring module that has the highest charge state in the assembly could then be responsible for the control of the next balancing cycle. The cycle includes the determination of one of the two adjacent battery cells having the higher charge state. The brief switching of the two battery cells in series to the balancing bus for the charge discharge to the energy storage module is initiated by means of a control command. A further control command will then initiate the brief switching of the weakest battery cell for the charge removal from the energy storage module. The battery cell monitoring module of the weakest battery cell here takes over the monitoring of the charge cycle voltage (voltage, current) and the disconnection from the balancing bus. After the next charge state determination, the next balancing cycle is then carried out as described above.

Advantageous embodiments of the invention can be seen from the dependent claims, from the description, and from the drawing.

In accordance with an embodiment, each of the electronic battery cell monitoring modules can connect the positive terminal of the battery cell by means of the first electrical switch to one of the electrical lines of the balancing bus and the negative terminal of the battery cell by means of the second electrical switch to the other electrical line of the balancing bus independently of the further electronic battery cell monitoring modules. Each of the electronic battery cell monitoring modules has electrical switches that are individually switchable. The design of the switches as semiconductor components makes it possible to implement high switching frequencies and simultaneously to ensure a long service life.

Each of the electronic battery cell monitoring modules can preferably connect the positive terminal of the battery cell by means of the first electrical switch to one of the electrical lines of the balancing bus and an adjacent battery cell monitoring module can connect the negative terminal of the battery cell by means of the second electrical switch to the other electrical line of the balancing bus independently of the further electronic battery cell monitoring module, with this also being able to take place in reverse order and polarity depending on the order of the cells. The adjacent battery cells are each electrically connected to the remaining negative terminal and positive terminal of the respective adjacent battery cell in a serial connection so that a total voltage at the balancing bus is reached that is higher by a factor of two. It is, for example, possible by the independent switching possibility of the electrical switches to switch the positive terminal of a battery cell to one of the two electrical lines and to switch the negative terminal of the adjacent battery cell to the second of the two electrical lines. The electrical energy storage device can be given a higher charge by the doubled voltage that is now applied between the two electrical lines to then have more energy or a higher charge potential available for the later withdrawal from the energy storage device. This makes the use of electronic DC/DC voltage transformers superfluous. In combination with short switching times, a plurality of battery cells can also be charged after one another with one charge of the electrical store without having to charge the electrical energy storage device in the meantime.

The battery cell monitoring module preferably has at least one electrical data port that is capacitively connected to one of the electrical lines of the balancing bus, with control signals being transmitted to the data port by modulation on this electrical line. Additional signal lines can be omitted by the modulating on one electrical line or on both electrical lines.

The battery cell monitoring module preferably has at least one optical data port and the balancing bus has an optical line, with the data port being optically connected to the optical line of the balancing bus, and with control signals being transmitted by modulation of light on the corresponding optical line. In automotive engineering, the use of optical lines has proven itself in environments contaminated especially highly electromagnetically to avoid interference in the data transmission.

In accordance with a further embodiment, the battery cell monitoring module has at least one electrical data port that is designed in a two-terminal manner. The balancing bus comprises two electrical data lines that are connected to the two-terminal electrical data port. A respective data line is connected to an electrical data port. The control signals are transmitted by modulation on the two electrical data lines. Depending on the required data transmission rate, two electrical wires can also be used as the data line. These wires are preferably twisted with one another to minimize interference. If necessary, the system can also communicate by radio. With known techniques such as wireless LAN, Bluetooth, or NFC being able to be used. The use of radio technology for communication would reduce the hardware amount to the two electrical lines required for the charge shift.

The electronic battery cell monitoring modules are preferably programmable and comprise at least one microprocessor module that has data storage means, input/output ports, temperature measurement means and voltage measurement means, with the electronic battery cell monitoring modules having a basic communication function for communication with the other battery cell monitoring modules by means of the balancing bus. Microprocessor modules having the above-named properties have long been used in industry and can be purchased inexpensively. A large number of these microprocessor modules have an implemented communication function with different transmission protocols and methods used in the industry. This communication function reduces the development effort in the programming. Such microprocessor modules furthermore predominantly have an energy-saving function that reduces the power consumption to a minimum.

The electronic battery cell monitoring modules preferably each have a unique identifier, e.g. according to the UUID standard, with this identifier being indelibly implemented in the battery cell monitoring modules and being able to be invoked via the balancing bus. This unique identifier can, for example, be stored in an EPROM on the battery cell monitoring module.

A universally unique identifier (UUID) is a standard for identification that is used in software development. It was standardized by the Open Software Foundation (OSF) as part of the Distributed Computing Environment (DCE). It is the purpose of UUIDs to be able to clearly mark information in distributed systems without any central coordination. A UUID consists of a 16-byte number that is written in hexadecimal notation and is divided into five groups.

The electronic battery cell monitoring modules preferably store the characteristic data of the corresponding battery cell in updated form over the service life of the battery cell. Information on the number of charge and discharge cycles and further characteristic data of the battery cell are continuously stored and can be invoked via the balancing bus. For example, a service unit could be connected to the balancing bus or directly to an electronic battery cell monitoring module to view or download these data. It is possible by using these data to make a prediction on the further use capability of the battery cell and to replace it as required.

The electronic battery cell monitoring module is preferably integrally formed with the battery cell, whereby an autonomous battery element is produced. The electronic battery cell monitoring module is relatively small in relation to the battery cell and can be adhesively bonded to the battery cell. An integration in the housing of the battery cell is also conceivable, which is reflected in increased protection against damage to or manipulation of the electronic battery cell monitoring module.

In accordance with a further embodiment, the battery cell of the battery module can also be balanced during operation as an energy supply and in times at which the battery module is not connected either to an energy supply or to a consumer. The battery module thereby retains its full function even if it is stored temporarily as a spare part. A total discharge of a battery cell is largely prevented since all the battery cells are kept at a similar voltage level. To prevent a total discharge of the total battery module, a signal apparatus can be provided at the current connectors of the battery module that signals a total discharge that signals that the total voltage of the battery module is too low.

The battery module preferably has an interface that is configured to connect the battery module to a control of an electrically driven vehicle. Electrically driven vehicles have a powerful control to monitor all the required functions. An interface to the control can be provided to supply the control continuously with the characteristic data of the battery cells. The interface can be an interface predefined by the manufacturer or can be another interface known and proven in the industry.

In the same manner, a balancing can also be carried out between modules that are connected together in series to form a battery pack.

The modules include serial connections of cells as described above. As in cell balancing, charge portions are here exchanged between modules.

The interface preferably has electrical or optical contacts that are configured to communicate with the control of other module, with that of the electrically driven vehicle, or with that of a storage system. The self-discharge can thereby be balanced, in particular with longer storage times. The battery module is completely integrated in the electrically driven vehicle by the connection of the balancing bus to the network of the electrically driven vehicle, which results in an increased failsafe of the vehicle since problems with the energy storage are recognized at an early stage.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
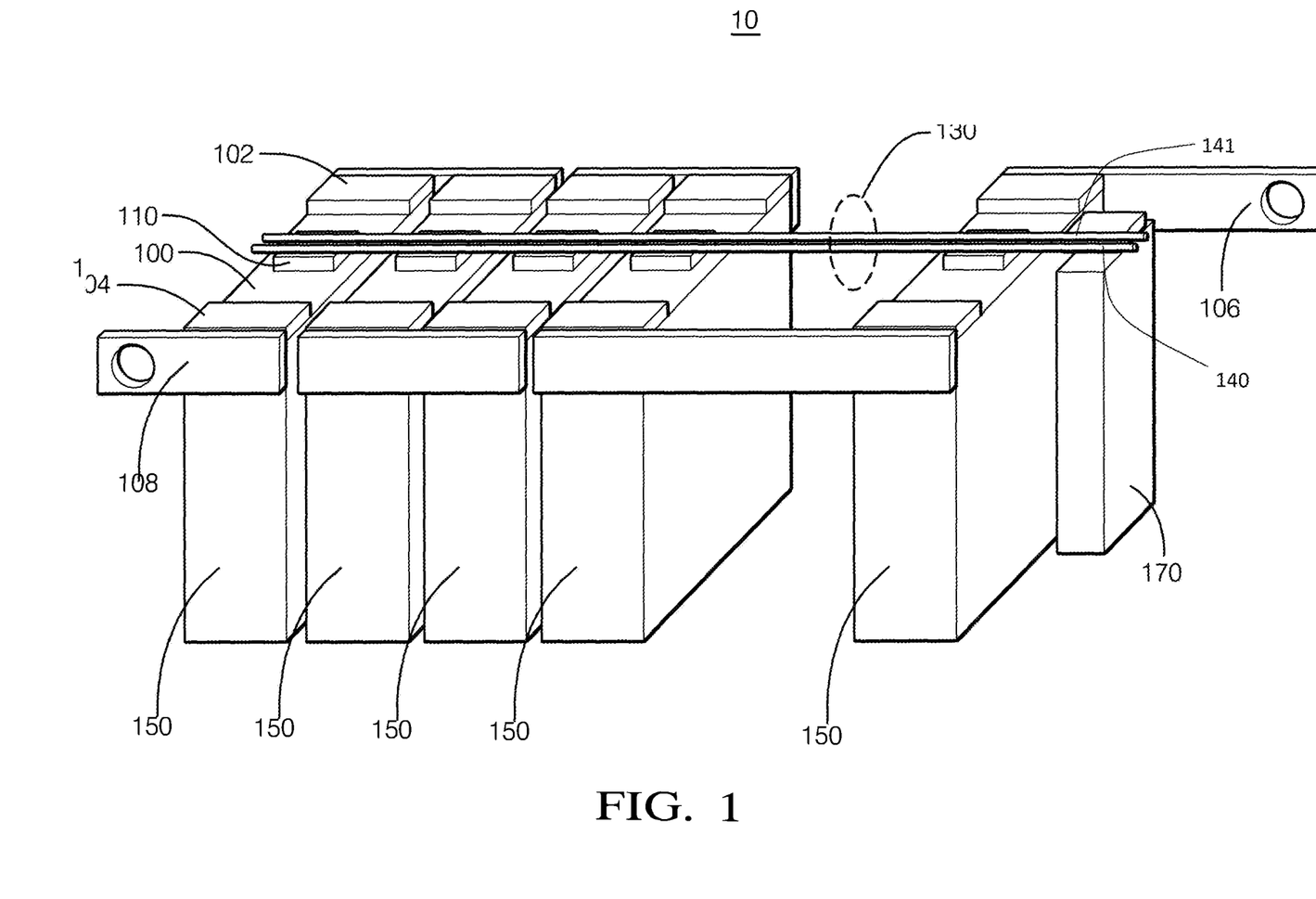
FIG. 1 shows a perspective representation of the battery module.

FIG. 1 shows a perspective representation of a battery module 10. The battery module 10 comprises a plurality of battery cells 100. An electronic battery cell monitoring module 110 is attached to each of the battery cells 100. The battery cell monitoring modules 110 are connected to one another by a balancing bus 130 comprising at least two electrical lines 140, 141 for transmitting data and electrical current. The battery cell monitoring modules 110 are electrically connected to a positive terminal 102 and to a negative terminal 104 of the battery cell 100. The battery cell monitoring module 110 is integrally formed with the battery cell 100, whereby an autonomous battery element 150 is formed. Each battery cell 100 of the battery module 10 is respectively electrically connected at its own positive terminal 102 to a negative terminal 104 of an adjacent battery cell 100. Each battery cell 100 of the battery module 10 is furthermore respectively electrically connected at its own negative terminal 104 to a positive terminal 102 of an adjacent battery cell 100. So that a serial connection of battery cells 100 is produced. There is an exception in the first and last battery cells 100 whose free terminals are provided with a connector element 106, 108 to make the battery module 10 connectable to an electrical device.

Figure 2:
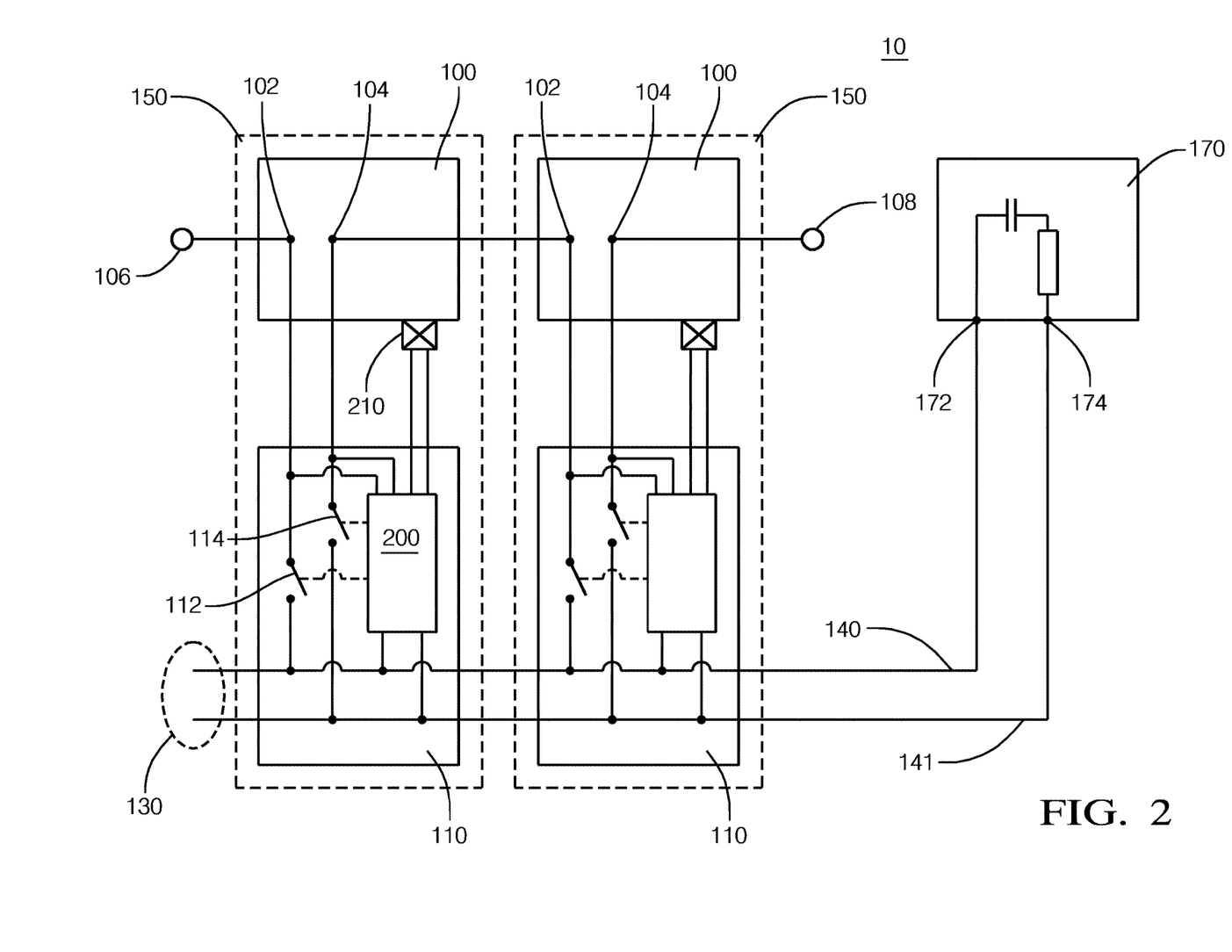
FIG. 2 shows a schematic representation of the battery module.

FIG. 2 shows a schematic representation of the battery module 10. Only two battery cells are shown by way of example. The battery cell monitoring modules 110 have a first electrical switch 112 and a second electrical switch 114. The electrical switches 112, 114 are configured to electrically connect the battery cells 100 to a respective one of the two electrical lines 140, 141 of the balancing bus 130. The battery module 10 comprises an energy storage module 170 for storing electrical energy. The energy storage module 170 in the representation comprises by way of example a combination of capacitor and coil. An alternative storage device for electrical energy could, however, also be used. The energy storage module 170 is electrically connectable to the two electrical lines 140, 141 of the balancing bus 130 to take up or output electrical energy over them. In the representation, the connectors 172, 174 of the energy storage module 170 are connected to the two electrical lines 140, 141. The battery cell monitoring modules 110 and the energy storage module 170 are connected to one another by the balancing bus 130 and form a cell balancing system. Each of the battery cell monitoring modules 110 can connect the positive terminal 102 of the battery cell 100 by means of the first electrical switch 112 to one of the electrical lines 140, 141 of the balancing bus 130 and the negative terminal 104 of the battery cell 100 by means of the second electrical switch 114 to the other electrical line 141 of the balancing bus 130 independently of the further battery cell monitoring modules 110. Each of the battery cell monitoring modules 110 is programmable and has at least one microprocessor module 200 that comprises data storage means, input/output ports, temperature measurement means, and voltage measurement means. The temperature measurement means is configured as a temperature sensor 210 in this representation. The battery cell monitoring modules 110 have a basic communication function for communication with the other battery cell monitoring modules 110 by means of the balancing bus 130.

Figure 3:
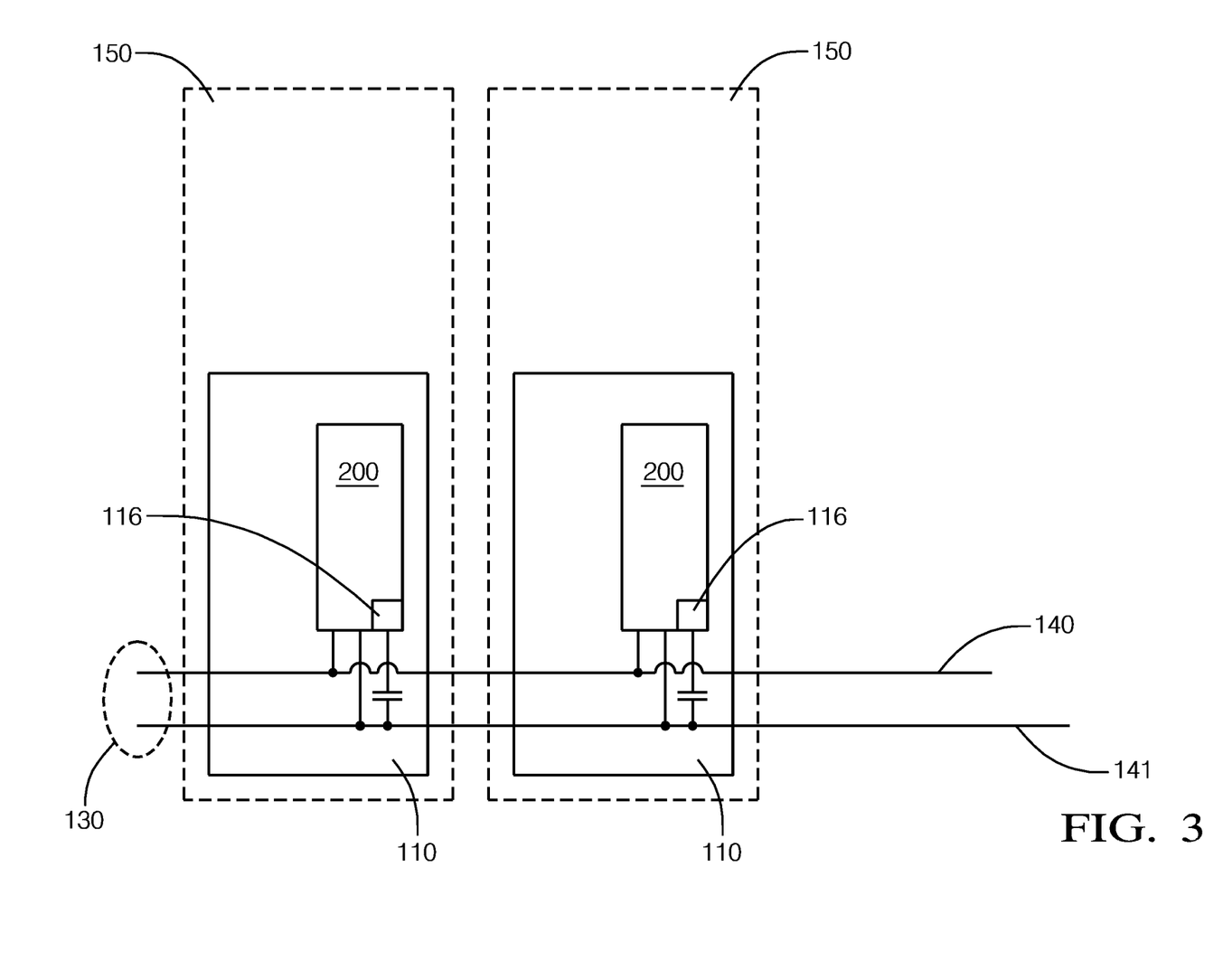
FIG. 3 shows details of the capacitive coupling of the data port in a schematic representation.

FIG. 3 shows details of the capacitive coupling of the data port in a schematic representation. The battery cell monitoring module 110 has at least one electrical data port 116 that is capacitively connected to one of the electrical lines 140, 141 of the balancing bus 130, with control signals being transmitted to the data port 116 by modulation on this electrical line 140, 141.

Figure 4:
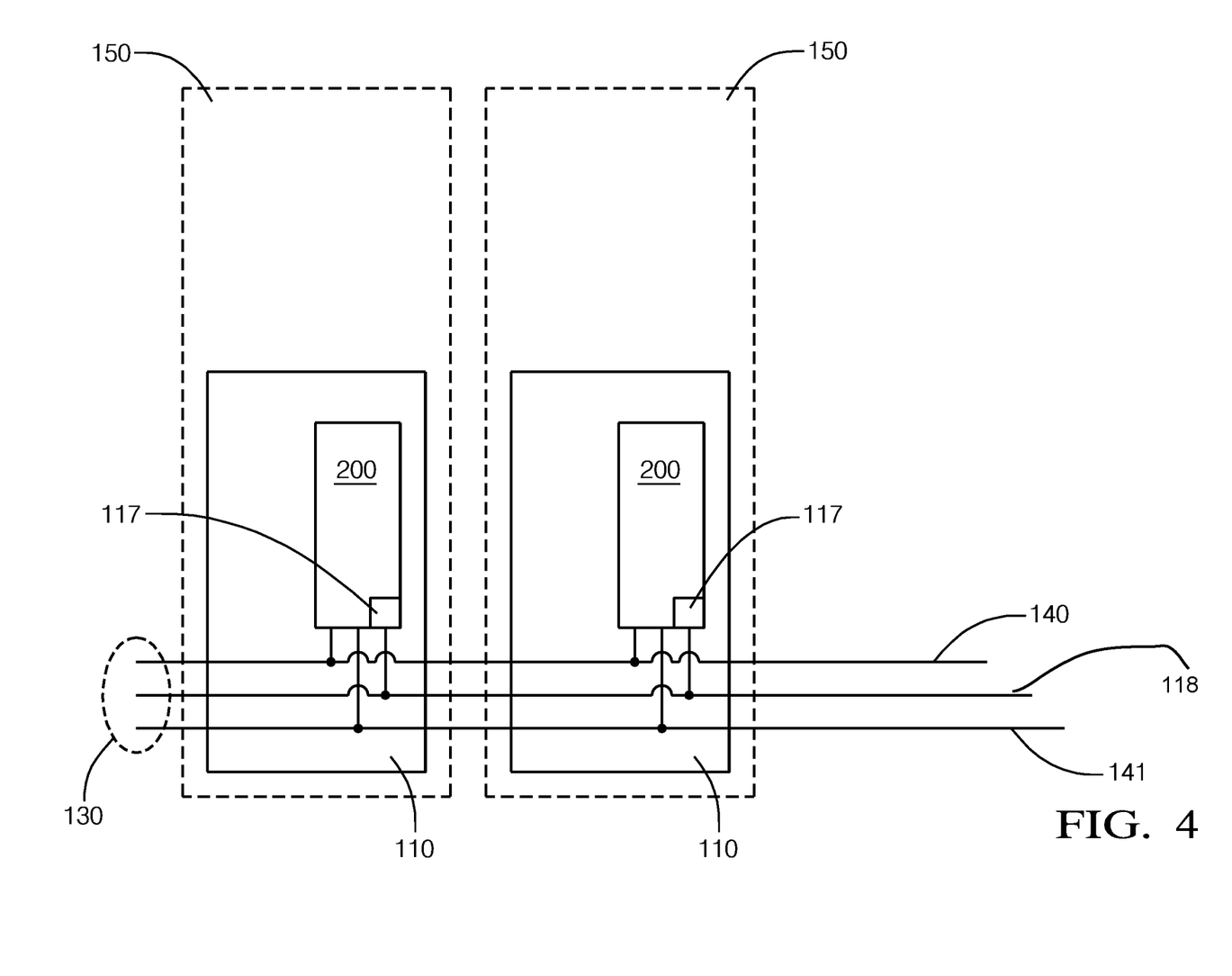
FIG. 4 shows details of the optical coupling of the data port in a schematic representation.

FIG. 4 shows details of the optical coupling of the data port in a schematic representation. The battery cell monitoring module 110 has at least one optical data port 117. The balancing bus 130 has an optical line 118, with the data port 117 being optically connected to the optical line 118 of the balancing bus 130. The control signals are transmitted by modulation of light on the optical line 118.

Figure 5:
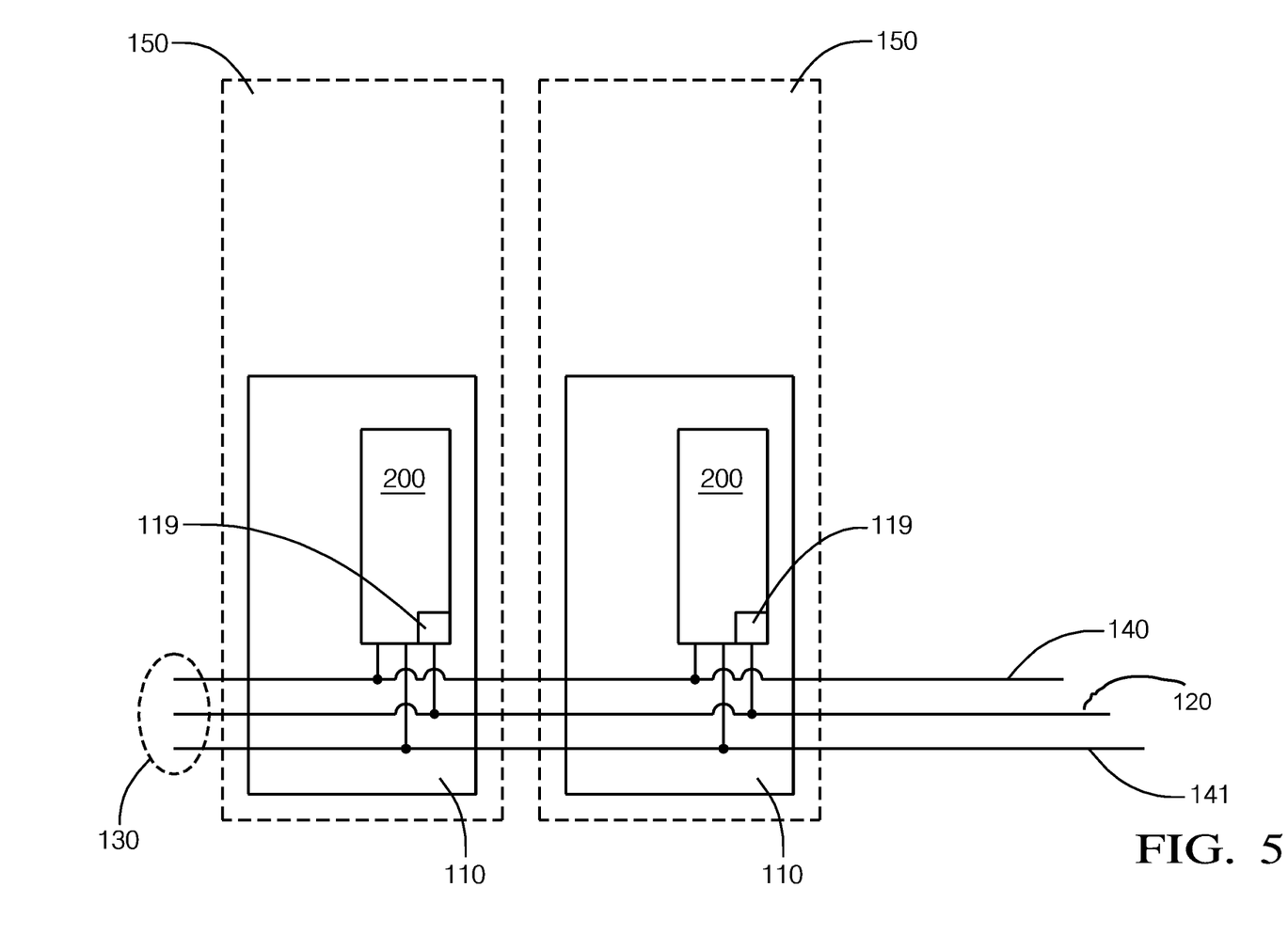
FIG. 5 shows details of the electrical coupling of the data port in a schematic representation.

FIG. 5 shows details of the electrical coupling of the data port in a schematic representation. The battery cell monitoring module 110 has at least one electrical data port 119 that is designed with one terminal or two terminals. The balancing bus 130 comprises one data line 120 or two data lines 120 that is/are electrically connected to the single terminal or two-terminal electrical data port 119, with a respective one of the electrical data lines 120 being connected to an electrical terminal of the data port 119. The control signals are transmitted by modulation on the one electrical data line 120 or on the two electrical data lines 120.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A battery module for battery packs comprising a plurality of battery cells, said battery module comprising:
    an electronic battery cell monitoring module attached to each battery cell in the plurality of battery cells, with the battery cell monitoring modules being connected to one another by a balancing bus comprising two electrical lines for transmitting data and electrical current, with the electronic battery cell monitoring modules being electrically connected to a positive terminal and to a negative terminal of each battery cell, with the electronic battery cell monitoring modules having a first electrical switch and a second electrical switch, with the first and second electrical switches being configured to electrically connect each battery cell to a respective one of the two electrical lines of the balancing bus, wherein the electronic battery cell monitoring modules include voltage measurement means, wherein the electronic battery cell monitoring module communicate measured voltages associated with each battery cell to one another via data transmission on the balancing bus; and
    an energy storage module for storing electrical energy, with the energy storage module being electrically connected to the two electrical lines of the balancing bus, wherein the battery cell monitoring module with the highest measured battery cell voltage and adjacent battery cell monitoring module control selective first and second electrical switches to connect a first battery cell and a battery cell adjacent to the first battery cell in series to provide a total voltage that is a sum of the first battery cell and the adjacent battery cell to the energy storage module for storage via the balancing bus, and wherein the battery cell monitoring module associated with a second battery cell having the lowest measured battery cell voltage subsequently controls respective first and second switches to provide stored electrical energy from the energy storage module to the second battery cell via the balancing bus, and with the electronic battery cell monitoring modules and the energy storage module being connected to one another by the balancing bus to form a battery cell balancing system.

2. The battery module in accordance with claim 1, wherein each of the electronic battery cell monitoring modules can connect the positive terminal of each battery cell by means of the first electrical switch to one of the two electrical lines of the balancing bus and the negative terminal of each battery cell by means of the second electrical switch to the other electrical line of the balancing bus independently of the other electronic battery cell monitoring modules.

3. The battery module in accordance with claim 2, wherein each of the electronic battery cell monitoring modules can connect the positive terminal of each battery cell by means of the first electrical switch to one of the two electrical lines of the balancing bus and another battery cell monitoring module can connect the negative terminal of each battery cell by means of the second electrical switch to the other electrical line of the balancing bus independently of the other electronic battery cell monitoring modules, with this also being able to take place in reverse order and polarity depending on the order of the battery cells.

4. The battery module in accordance with claim 1, wherein the battery cell monitoring module has an electrical data port that is capacitively connected to only one of the two electrical lines of the balancing bus, with control signals being transmitted to the electrical data port by modulation on this electrical line.

5. The battery module in accordance with claim 1, wherein the battery cell monitoring module has an optical data port, and wherein the balancing bus has an optical line, with the optical data port being optically connected to the optical line of the balancing bus, and with control signals being transmitted by modulation of light on a corresponding optical line.

6. The battery module in accordance with claim 1, wherein the battery cell monitoring module has an electrical data port that is designed with two terminals;
    and wherein the balancing bus comprises two electrical data lines that are connected to the two-terminal electrical data port, with a respective electrical data line being connected to an electrical data port and with control signals being transmitted by modulation on the two electrical data lines.

7. The battery module in accordance with claim 1, wherein the electronic battery cell monitoring modules are programmable and have a microprocessor module that comprises data storage means, input/output ports, and temperature measurement means, with the electronic battery cell monitoring modules having a basic communication function for communication with the other battery cell monitoring modules by means of the balancing bus.

8. The battery module in accordance with claim 7, wherein the electronic battery cell monitoring modules each have a unique number, with this number being indelibly implemented in the battery cell monitoring modules and being able to be invoked via the balancing bus.

9. The battery module in accordance with claim 8, wherein the unique number, e.g. conforms to the universally unique identifier (UUID) standard.

10. The battery module in accordance with claim 7, wherein the battery cell monitoring modules store characteristic data of a corresponding battery cell updated over the service life of each battery cell.

11. The battery module in accordance with claim 1, wherein the electronic battery cell monitoring module is integrally formed with each battery cell, whereby an autonomous battery element is formed.

12. The battery module in accordance with claim 1, wherein each battery cell of the battery module can be balanced during operation as an energy supply and in times at which the battery module is not connected either to an energy supply or to a consumer.

13. The battery module in accordance with claim 1, wherein the battery module has an interface that is configured to connect the battery module to another battery module and to a controller associated with an electrically driven vehicle.

14. The battery module in accordance with claim 13, wherein the interface has electrical contacts that are each connected to one of the two electrical lines of the balancing bus and are configured to swap electrical currents of the battery modules among one another or to conduct the electrical currents from the outside into an energy storage device and to thereby charge it.

15. The battery module in accordance with claim 14, wherein the interface has electrical or optical contacts that are configured to communicate with a controller of other modules of the electrically driven vehicle or with that of a storage system.

16. A method of adapting charge state of individual battery cells of a battery module to a uniform level comprising the steps of:
  a) providing the battery module, comprising a plurality of battery cells comprising a respective electronic battery cell monitoring module attached to each battery cell, with the battery cell monitoring modules being connected to one another by a balancing bus comprising two electrical lines for transmitting data and electrical current, with the electronic battery cell monitoring modules being electrically connected to a positive terminal and to a negative terminal of each battery cell of the plurality of battery cells, with the electronic battery cell monitoring modules having a first electrical switch and a second electrical switch, with the first and second electrical switches being configured to electrically connect each battery cell to a respective one of the two electrical lines of the balancing bus, with the battery module comprising an energy storage module for storing electrical energy, with the energy storage module being electrically connected to the two electrical lines of the balancing bus to take up or output electrical energy over them, and with the electronic battery cell monitoring modules and the energy storage module being connected to one another by the balancing bus forming a battery cell balancing system;
  b) connecting the positive terminal of each battery cell to the negative terminal of a first adjacent battery cell and connecting the negative terminal of each battery cell to the positive terminal of a second adjacent battery cell such that a serial connection of all of the battery cells in the plurality of battery cells is produced, with the positive terminal and the negative terminal of the serial connection not being connected to one another;
  c) starting communication between all of the connected battery cell control modules over the balancing bus;
  d) identifying all the battery cell monitoring modules;
  e) determining an arrangement of each battery cell in the battery module;
  f) communicating charge states of each battery cell over the balancing bus;
  g) taking over of control by the battery cell monitoring module having the highest transmitted charge voltage;
  h) switching two battery cells connected in series to the balancing bus in each case by the positive terminal of the one battery cell and the negative terminal of the other battery cell, with one of the battery cells being the battery cell with the highest cell voltage and a second battery cell disposed in series having a comparatively higher cell voltage of these two adjacent cells disposed in series;
  i) charging an electrical energy storage device;
  j) disconnecting each battery cell from the balancing bus;
  k) switching the positive terminal and the negative terminal of battery cells having a lowest charge voltage to the balancing bus;
  l) charging each battery cell with electrical energy from the electrical energy storage device;
  m) disconnecting each battery cell from the balancing bus; and
  n) repeating steps f) through m).

* * * * *